United States Patent
Chan (10) Patent No.: US 7,562,008 B2
(45) Date of Patent: Jul. 14, 2009

(54) MACHINE TRANSLATION METHOD AND SYSTEM THAT DECOMPOSES COMPLEX SENTENCES INTO TWO OR MORE SENTENCES

(76) Inventor: Ning-Ping Chan, 1395 Spruce St., Berkeley, CA (US) 94709

( * ) Notice: Subject to any disclaimer, the term of this patent is extended or adjusted under 35 U.S.C. 154(b) by 671 days.

(21) Appl. No.: 10/876,206

(22) Filed: Jun. 23, 2004

(65) Prior Publication Data

US 2006/0009961 A1    Jan. 12, 2006

(51) Int. Cl.
  G06F 17/27    (2006.01)
  G06F 17/20    (2006.01)
  G06F 17/28    (2006.01)

(52) U.S. Cl. .................. 704/9; 704/1; 704/2; 704/8

(58) Field of Classification Search ............... 704/1, 704/8, 9; 434/167
  See application file for complete search history.

(56) References Cited

U.S. PATENT DOCUMENTS

| | | | | |
|---|---|---|---|---|
| 5,369,574 | A | * | 11/1994 | Masegi et al. ............... 704/9 |
| 5,642,520 | A | * | 6/1997 | Takeshita et al. ............ 704/3 |
| 5,903,858 | A | * | 5/1999 | Saraki ......................... 704/4 |
| 6,002,997 | A | | 12/1999 | Tou |
| 6,023,669 | A | * | 2/2000 | Suda et al. ................... 704/2 |
| 6,055,528 | A | | 4/2000 | Evans |
| 6,064,951 | A | | 5/2000 | Park |
| 6,081,774 | A | | 6/2000 | de Hita |
| 6,092,035 | A | | 7/2000 | Kurachi |
| 6,119,078 | A | | 9/2000 | Kobayakawa |
| 6,139,201 | A | | 10/2000 | Carbonell |
| 6,161,082 | A | | 12/2000 | Goldberg |
| 6,173,279 | B1 | | 1/2001 | Levin |
| 6,236,958 | B1 | | 5/2001 | Lange et al. |
| 6,347,316 | B1 | | 2/2002 | Redpath |
| 6,505,151 | B1 | * | 1/2003 | Chou et al. .................. 704/9 |
| 6,604,101 | B1 | | 8/2003 | Chan |
| 6,957,213 | B1 | * | 10/2005 | Yuret ........................... 707/4 |
| 7,136,806 | B2 | * | 11/2006 | Miyahira et al. ............. 704/9 |
| 2002/0046018 | A1 | * | 4/2002 | Marcu et al. ................. 704/9 |
| 2004/0006560 | A1 | | 1/2004 | Chan et al. |
| 2005/0071150 | A1 | * | 3/2005 | Nasypny ...................... 704/9 |

OTHER PUBLICATIONS

Apposition, YourDictionary.com Jun. 5, 2004, http://web.archive.org/web/20040605114157/http://www.yourdictionary.com/ahd/a/a0382100.html.*

Clauses—Restrictive and Nonrestrictive, Nov. 2001, http://web.archive.org/web/20011101124626/http://www.kentlaw.edu/academics/lrw/grinker/LwtaClauses_Restrictive_and_Nonrest.htm.*

Maduro, Ralph M. et al. "Syntiactic Analysis for Ellipsis Handling in Coordinated Clauses," Lecture Notes in Computer Sciences, vol. 2507/2002, pp. 761-769, 2002.*

* cited by examiner

*Primary Examiner*—Richmond Dorvil
*Assistant Examiner*—Douglas C Godbold
(74) *Attorney, Agent, or Firm*—Dahyee Law Group; Leon E. Jew (57) ABSTRACT

The present invention discloses a technology for decomposing prose elements in document processing. Grammar analysis of complex sentences can identify main clause, embedded clauses, phrases and cohesive ties that link the embedded clauses to the main clause. Cohesive ties are stripped down and a weighted punctuation for segmentation is applied to decompose complex sentences into simple sentences.

4 Claims, 5 Drawing Sheets

The Paris MOU consists of 18 participating maritime Administrations and covers the waters of the European coastal States and the North Atlantic basin from North America to Europe. The Paris MOU aims at eliminating the operating of sub-standard ships through a harmonized system of port State control. — 10

Machine Translate 1: 巴黎MOU包括18 参与海管理和盖欧洲沿海状态的水和北方大西洋盆地从北美洲对欧洲。巴黎MOU瞄准消灭不标准的船的操作通过港状态控制一个谐调的系统。 — 20

Machine Translate 2: 巴黎MOU包括18 参与海管理和盖欧洲沿海状态的水和北方大西洋盆地从北美洲对欧洲。巴黎MOU瞄准消灭不标准的船的操作通过港状态控制一个谐调的系统。 — 30

MACHINE TRANSLATION METHOD AND SYSTEM THAT DECOMPOSES COMPLEX SENTENCES INTO TWO OR MORE SENTENCES

This application claims benefit to the U.S. patent application Ser. No. 449,740 filed on 29 May 2003, and is related to U.S. Pat. No. 6,604,101, the contents of which are incorporated in their entirety by reference herein.

BACKGROUND OF THE INVENTION

1. Technical Field

This invention relates to techniques in machine translation. More particularly, the invention relates to a method for decomposing prose elements in document processing.

2. Description of the Prior Art

As a research in linguistics has reported, length of sentence is of significance in reading comprehension. For example, when reading New York Times articles, the long sentences in the Editorial often cause havoc in processing. Human consciousness in processing language is just like a bird in flight—for a bird the more branches to have to perch on, the farther it can fly, and for human mind the more proper punctuation, the easier it moves on. For example, a five-word segment is easier to process than a ten-word segment, and simple sentences are easier to understand than complex sentences.

As being taught in grammar school, a complex sentence typically consists of main clause, co-ordinate clause(s), participle clause(s) and subordinate clause(s) in a number of combinations. Later in life, human being carefully adapts to parsing complex sentences. It would be advantageous that this internal process for decomposing complex sentences can be articulated so that it may be applied to machine translation techniques.

Figure 1:
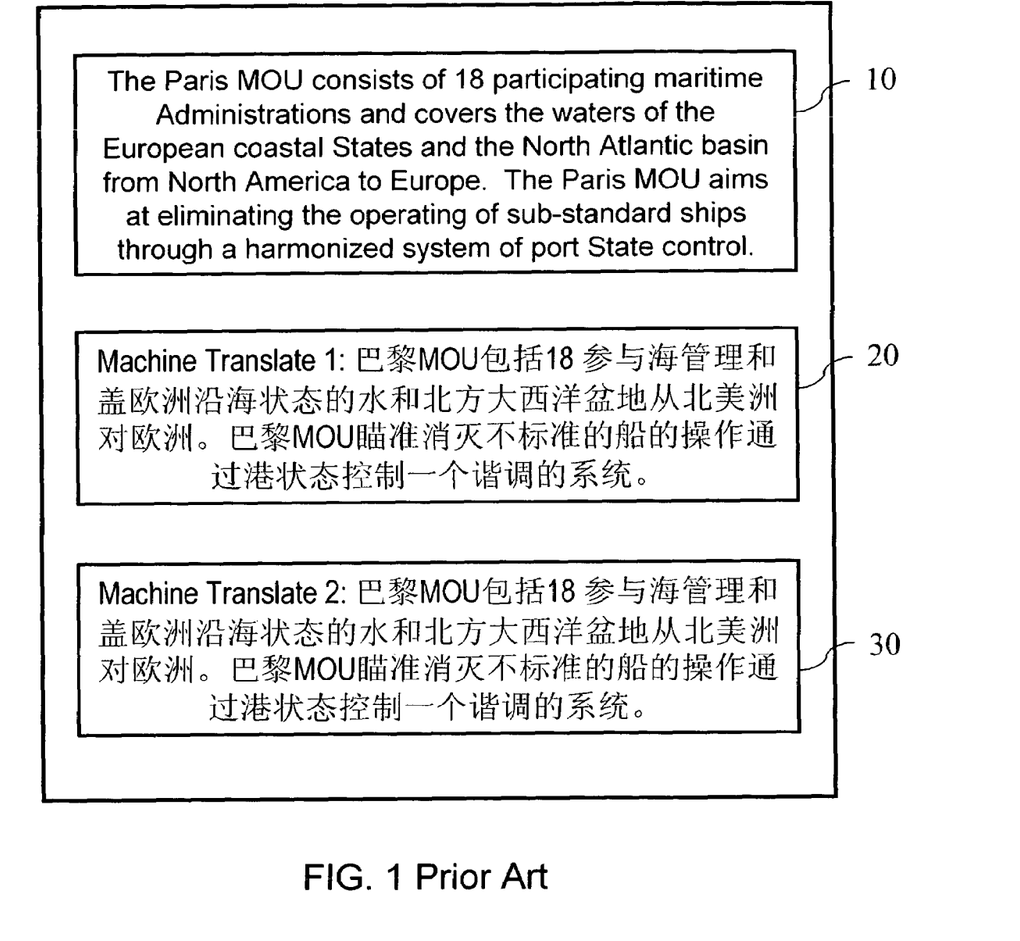
FIG. 1 is a search result from an Internet search with the original language, which is in English, and some machine translations of the search result.

As the current state of art in machine translation, there is no capability to decompose complex sentences into simple segments which can be easily understood by the reader. The lack of this capability typically results in the translations that are virtually undecipherable. FIG. 1 shows a search result from an Internet search query in English 10 and some machine translations 20 and 30 of the search result. The English version 10 of search result reads as:

The Paris MOU consists of 18 participating maritime Administrations and covers the waters of the European coastal States and the North Atlantic basin from North America to Europe. The Paris MOU aims at eliminating the operating of sub-standard ships through a harmonized system of port State control.

This search result consists of a description of Port State Control Paris MOU. As a Chinese reader can see, the machine-translated Chinese sentences 20 and 30 are virtually undecipherable because Chinese words all run into each other with no break. These translations lack the ability to segment the present participle clauses into understandable Chinese modules.

Researches in linguistics find that English and a number of other hypertactic languages are adorned with rich cohesive ties. For example, the follow sentences all have similar meanings but with different cohesive ties:

When the baby cried, the mother picked it up.
If the baby cried, the mother picked up.
Upon hearing the baby cried, the mother picked it up.
Judging from the fact that the baby cried, the mother picked it up.

At the same time, Chinese and other paratactic language emphasize on oral tradition and/or narratives in abundance, or they are highly developed prior to printing technology. Speakers in these paratactic languages can figure out just from the following two simple sentences:

The baby cried. The mother picked it up.

It is therefore desired a technology in machine translation which can pre-process complex sentences into manageable segments for ease of human understanding, preferably such technology should decompose complex sentences into simple sentences.

It is further desired that such technology is able to identify, isolate and strip out cohesive ties in comparatively more hypertactic language for the benefit of people more accustomed to paratactic language.

It is further desired that such technology can be applied to machine translation so that the comparatively independent linguistic components such as clauses and phrases can be translated to a second language, and the translated results in the second language can be easily understand by the speakers of the second language.

SUMMARY OF THE INVENTION

The present invention discloses a technology for decomposing prose elements in document processing. Grammar analysis of complex sentences can identify main clauses, embedded clauses, phrases, and cohesive ties linking the embedded clauses to the main clause. Cohesive ties are identified, isolated, and stripped down and a weighted punctuation for segmentation is applied to decompose complex sentences into simple sentences.

In one preferred embodiment of the invention, a language processing system is disclosed for pre-processing complex sentences in a first language into manageable segments for ease of human understanding. The language processing system at least includes: (a) a grammar analysis module for identifying main clause, embedded clauses, and all possible cohesive ties between the main clause and the embedded clauses; (b) a cohesive tie stripping module for filtering or stripping down the possible cohesive ties between the main clause and the embedded clauses; and (c) a punctuation module for applying a weighted punctuation for segmentation to decomposing said complex sentence into simple sentences.

In another preferred embodiment of the invention, a method for pre-processing complex sentences in a first language into manageable segments for ease of human understanding is disclosed. The method includes the steps of:

(a) performing grammar analysis on a complex sentence to identifying main clause, embedded clauses, and all possible cohesive ties between the main clause and the embedded clauses;

(b) stripping down the possible cohesive ties between the main clause and the embedded clauses; and (c) applying a weighted punctuation for segmentation to decomposing the complex sentence into simple sentences.

DETAILED DESCRIPTION OF THE INVENTION

With reference to the drawings, the present invention will now be described in detail with regard for the best mode and the preferred embodiments. In its most general form, the invention comprises a program storage medium readable by a computer, tangibly embodying a program of instructions executable by the computer to perform the steps necessary to pre-process complex sentences in a first language into manageable segments for ease of human understanding of the end-result machine translation in a second language.

Figure 2:
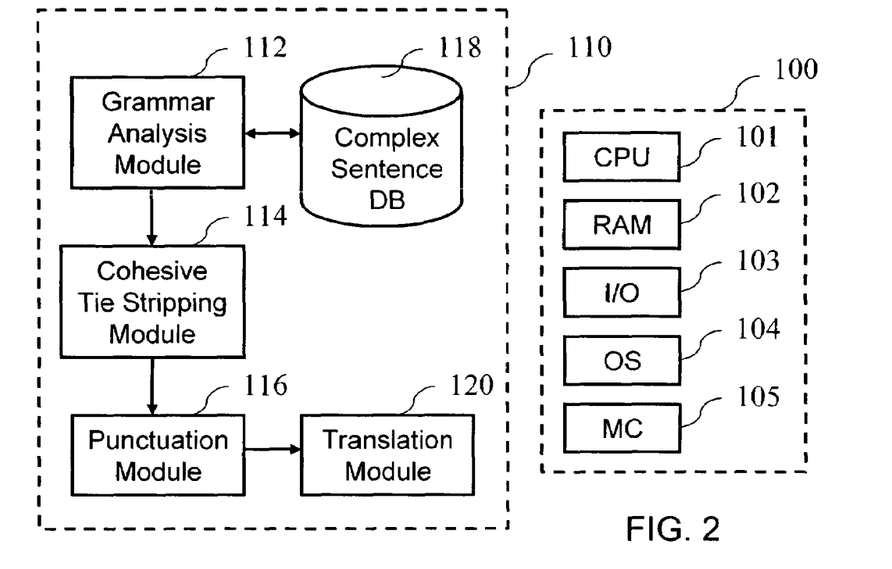
FIG. 2 is a schematic block diagram illustrating a language processing system for decomposing complex sentences into simple segments according to one preferred embodiment.

FIG. 2 is a schematic block diagram illustrating a language processing system 110 for decomposing complex sentences into simple segments according to one preferred embodiment. The language processing system 110 runs on a computer platform 100 which includes one or more central processing units (CPU) 101, a random memory (RAM) 102, an input/output (I/O) interface 103, an operating system (OS) 104, and optionally a microinstruction code (MC) 105. The language processing system 110 may be part of the microinstruction code (MC) 105 or an application program to be executed via the operating system (OS) 104. Those skilled in the art will readily understand that the language processing system 110 may be implemented within other systems without substantial changes.

The language processing system 110 preferably includes the following components: a grammar analysis module 112, a cohesive tie stripping module 114 for filtering or stripping down cohesive ties, and a punctuation module 116. The language processing system 110 is able to decompose complex sentences into simple sentences. A complex sentence typically consists of a main clause, one or more co-ordinate clauses, one or more participle clauses, one or more subordinate clauses, and phrases in a number of combinations. In this application, the term "phrases" may include, but not limited to, verb phrase, noun phrase, adjective phrase, prepositional phrase, postpositional phrase, adverbial phrases, temporal adverb, conjunction, idiom, cohesive tie, spatial adverb, and the like.

When a complex sentence enters the language processing system 110, the grammar analysis module 112 is first invoked. The grammar analysis module 112 identifies the main clause, embedded clauses, and all possible cohesive ties that grammatically connect the embedded clauses to the main clause. The language processing system 110 can optionally include a database of complex sentences 118. This database of complex sentences 118 can be used by the grammar analysis module 112 to identify the main clause, the embedded clauses and the cohesive ties there between.

The cohesive tie stripping module 114 is invoked next. When the cohesive tie stripping module 114 is invoked, all cohesive ties identified by the grammar analysis module 112 are stripped down.

After stripping down all possible cohesive ties between the main clause and the embedded clauses, the punctuation module 116 is invoked. The punctuation module 116 applies a weighted punctuation for segmentation to decompose the complex sentence into simple sentences. The punctuation module 116 can either change one or more commas to a period, or it can supply one or more commas or periods.

The language processing system 110 may optionally contains a translation module 120. When the translation module 120 is present in the language processing system 110, the translation module is invoked to translate the decomposed sentences into a second language.

Figure 2A:
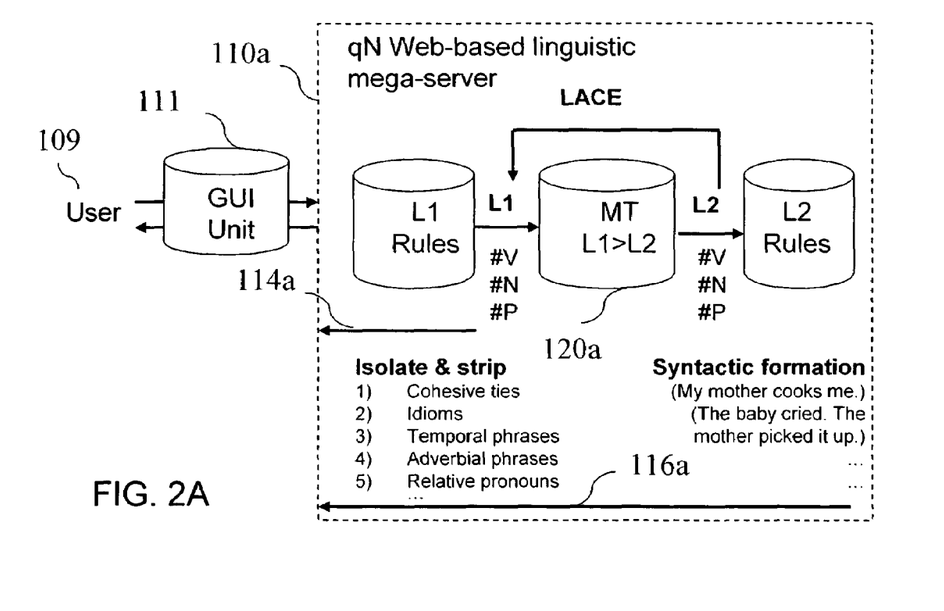
FIG. 2A is a schematic block diagram illustrating the work flow of the language processing system according to FIG. 2.

FIG. 2A is a schematic block diagram further illustrating the work flow of the language processing system 110 according to FIG. 2. Via the graphic user interface 111, a user 109 interacts with a web-based linguistic mega-server 110a which implements the language processing system 110. The server 110a includes a first linguistic rules database L1, which is used for isolating and stripping 114a. The server 110a further includes a second linguistic rules database L2, which is used for syntactic formation 116a. Optionally, the server 110a may further include a machine translation database 120a, which is used by the translation module 120 to translate the decomposed sentences from a first language into a second language.

Figure 2B:
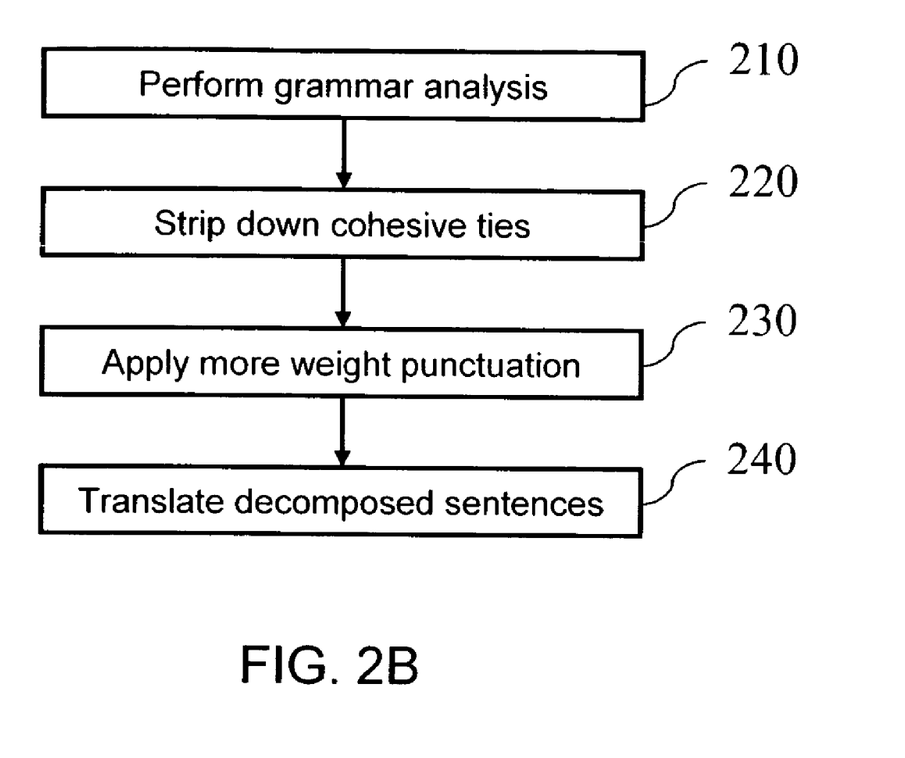
FIG. 2B is a block diagram illustrating a method for pre-processing complex sentences in a first language into manageable segments for ease of human understanding according to one preferred embodiment of the invention.

FIG. 2B is a block diagram illustrating a method for pre-processing complex sentences in a first language into manageable segments for ease of human understanding according to one preferred embodiment of the invention. The method is preferably implemented with the language processing system 110 as described above. The method includes the steps of:

Step 210: Perform grammar analysis on a complex sentence to identify main clause, embedded clauses, phrases and all possible cohesive ties between the main clause and the embedded clauses.

An optional database of complex sentences can be used in this step.

Step 220: Strip down all possible cohesive ties identified in step 210.

Step 230: Apply a weighted punctuation for segmentation to decompose the complex sentence into simple sentences.

The method can optionally include the step of:

Step 240: Translate the result simple sentences into a second language.

Figure 2C:
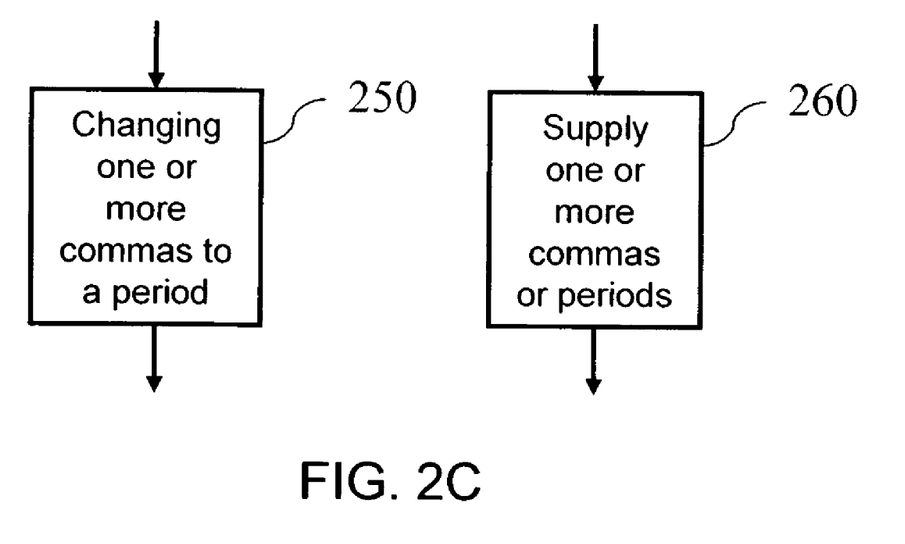
FIG. 2C is a block diagram illustrating the detailed substeps of the step of applying a weighted punctuation in the method shown in FIG. 2A.

FIG. 2C is a block diagram illustrating the detailed substeps of the step of applying more weight punctuation 230 in the method shown in FIG. 2A. The step 230 preferably includes the step of:

Step 250: Change one or more commas to a period.

Figure 3:
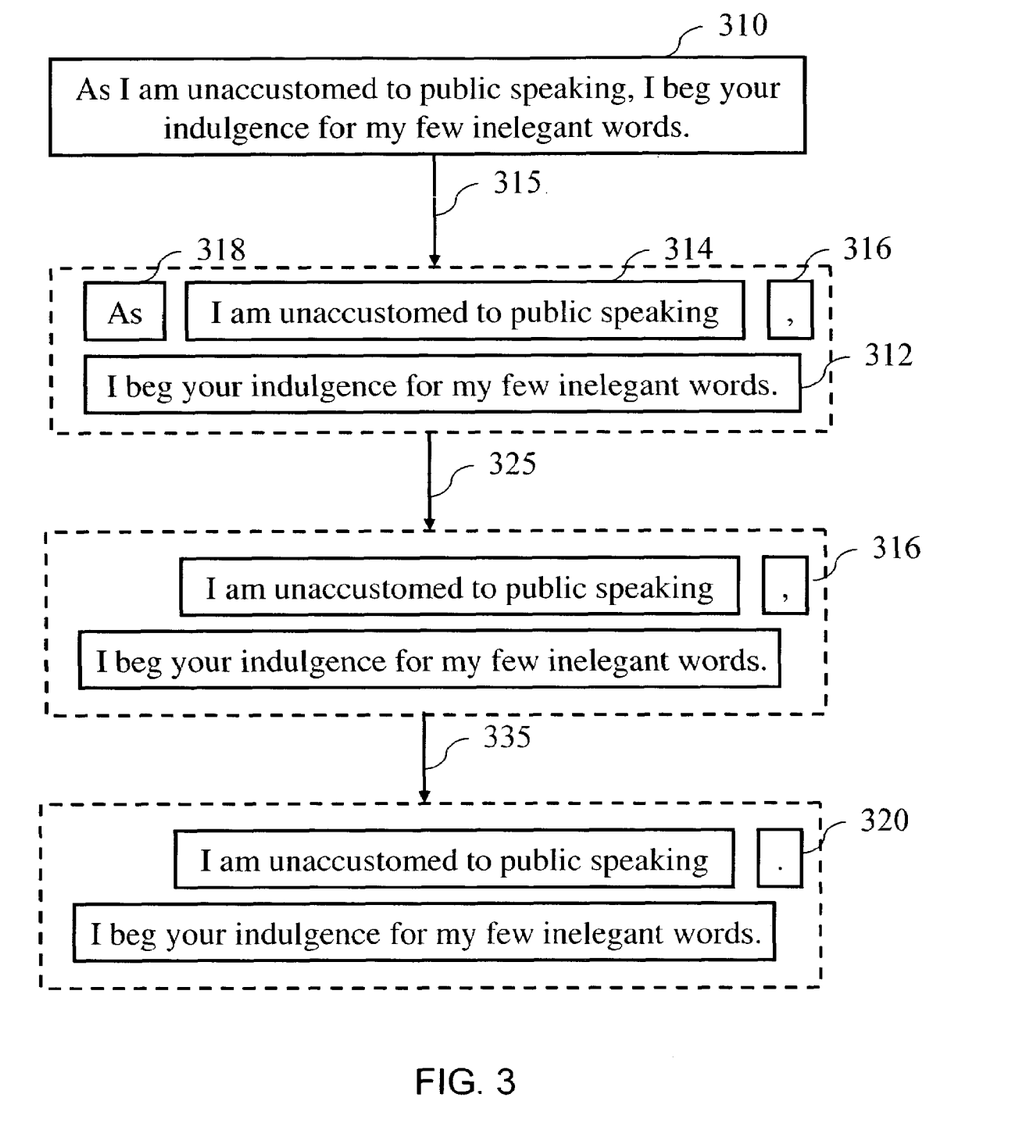
FIG. 3 is a schematic diagram for pre-processing a complex sentence into simple sentences by changing a comma to a period according to one preferred embodiment of the invention.

Referring to FIG. 3, which is a schematic diagram for pre-processing a complex sentence into simple sentences by changing a comma to a period according to one preferred embodiment of the invention. In FIG. 3, the method is being applied to a complex sentence 310. This complex sentence is as following:

As/I am unaccustomed/to public speaking,/I/beg your indulgence/for my few inelegant words./

In step 315, the language processing system 110 performs grammar analysis on the complex sentence 310. After performing grammar analysis, the following grammar structures are identified:

The main clause (312): I beg your indulgence for my few inelegant words.

The embedded clause (314): I am unaccustomed to public speaking.

The cohesive ties (318): As. The subordinate conjunction ties the main clause 312 and the embedded clause 314.

The complex sentence also contains a comma 316.

In step 325, the cohesive ties 318 are stripped down. The word "As" is removed from the sentence in this step.

In step 335, a weighted punctuation for segmentation is applied to decompose the complex sentence into simple sentences. The comma 316 is replaced by a period 320.

This sentence after preprocessing will be decomposed into the following:

I am unaccustomed to public speaking. I beg your indulgence for my few inelegant words.

As one can see, the decomposed sentences are easier to comprehend that the original complex sentence.

Now referring back to FIG. 2C which illustrates an equally preferred embodiment including the step of:

Step 260: Supply one or more commas or periods.

Figure 4:
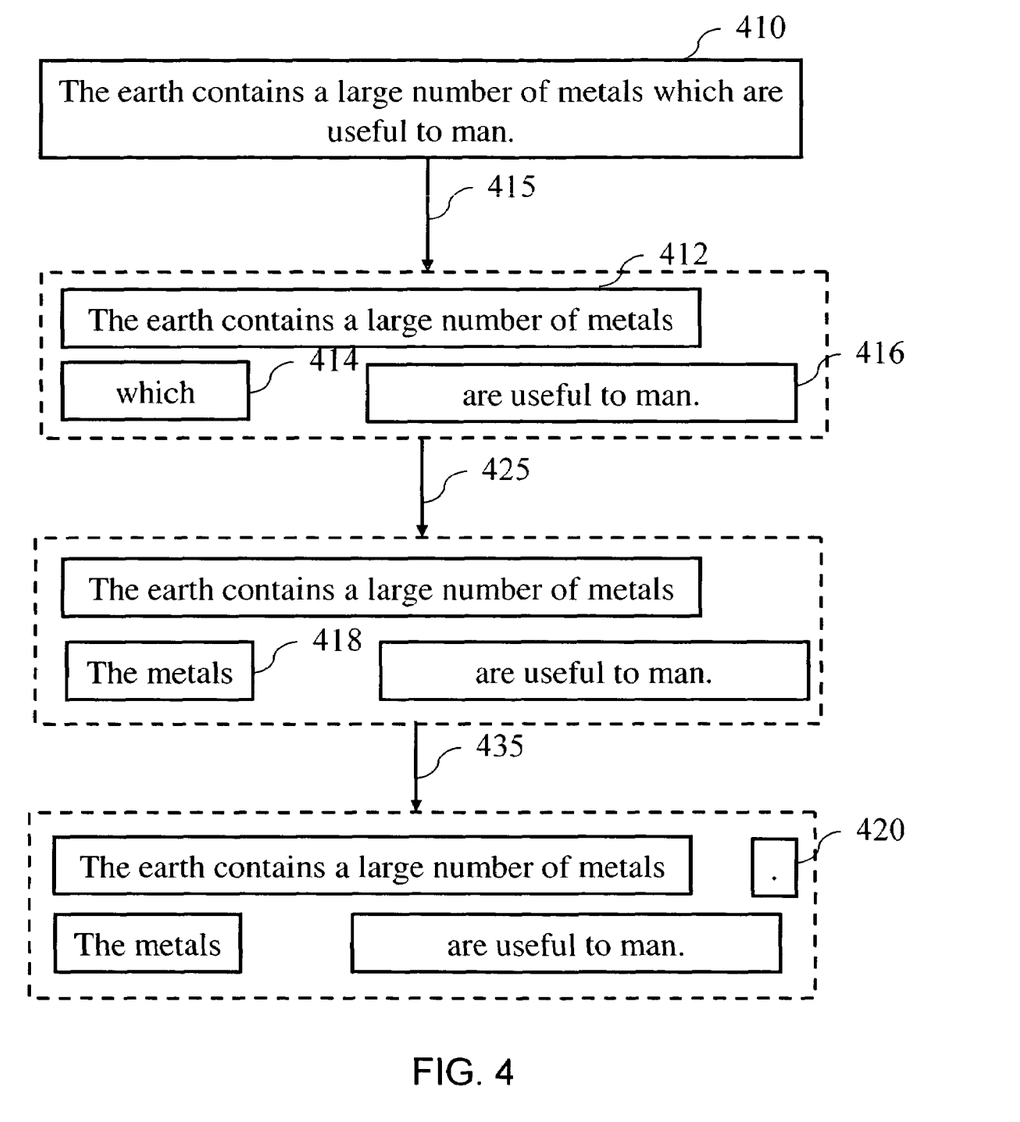
FIG. 4 is a schematic diagram for pre-processing a complex sentence into simple sentences by supplying a period according to one preferred embodiment of the invention.

Now referring to FIG. 4, which is a schematic diagram for pre-processing a complex sentence into simple sentences by supplying a period according to one preferred embodiment of the invention. In FIG. 4, the method is being applied to a complex sentence 410. This complex sentence is as the following:

The earth contains a large number of metals which are useful to man.

In step 415, the language processing system 110 performs grammar analysis on the complex sentence 410. After performing grammar analysis, the following grammar structures are identified:

The main clause (412): The earth contains a large number of metals.

The embedded clause (416): are useful to man.

The cohesive ties (414): which. This subordinate conjunction ties the main clause 412 and the embedded clause 416.

In step 425, the cohesive ties "which" 414 are stripped down. The word "which" is replaced with its equivalent part 418 in the main clause: "the metals" or "this".

In step 435, a weighted punctuation for segmentation is applied to decompose the complex sentence into simple sentences. A period 420 is supplied to separate the main clause 412 and the embedded clause 416.

This sentence after preprocessing will be decomposed into the following:

The earth contains a large number of metals. The metals (that is) are useful to man.

As one can see, the decomposed sentences are easier to comprehend than the original complex sentence.

In the sections below, some additional examples are used to illustrate the operation of invention. These examples are for illustration purpose only. Without departing from the spirit of the invention, those skillful in the art will be able to apply the technology of the invention to pre-process any other kinds of complex sentences into manageable segments for ease of human understanding. Therefore the present invention will by no means be limited by these examples.

EXAMPLE 1.1

Consider the Following Sentence

When the baby cried, the mother picked it up.

The comma in this sentence will be replaced by a period. This sentence will be decomposed into the following simple sentences:

The baby cried. The mother picked it up.

EXAMPLE 1.2

Consider the Following Sentence

As much as John wanted to help Mary, given the situation, she would not dream of asking.

Each of the commas in this sentence will be replaced by a period. This sentence will be decomposed into the following simple sentences:

John wanted to help Mary. Mary was given the situation. Mary would not dream of asking.

One common grammatical phenomenon often presents in complex sentences is ellipsis. Ellipsis is a common strategy of rhetoric in English and other hypertactic languages. It is the omission of one or more words that are obviously understood but that must be supplied to make a construction grammatically complete. When ellipsis is present in a complex sentence, the omitted words are typically added back or copied to make the sentence grammatically complete. This is typically performed during the step of grammatical analysis. The completed sentence is then decomposed into simple sentences as described above. The following are some examples illustrating how complex sentences with ellipsis are decomposed according to the method of the invention.

EXAMPLE 2.1

Consider the Following Sentence

Mary will prepare a dish for the party if John will.

For preprocessing before translation to another language, the words omitted by ellipsis will be added back or copied to make the above sentence complete and a comma will be added to separate the main clause and the subordinate clause. This sentence after preprocessing will be decomposed into the following:

Mary will prepare a dish for the party, if John will prepare a dish for the party.

EXAMPLE 2.2

Consider the Following Sentence

I am sad if you are.

For preprocessing before translation to another language, the words omitted by ellipsis will be added back or copied to make the above sentence complete and a comma will be added to separate the main clause and the subordinate clause. This sentence after preprocessing will be decomposed into the following:

I am sad, if you are sad.

EXAMPLE 2.3

Consider the Following Sentence

Jerry will write to the Congressman if Sam will too.

For preprocessing before translation to another language, the words omitted by ellipsis will be added back or copied to make the above sentence complete and a comma will be added to separate the main clause and the subordinate clause. This sentence after preprocessing will be decomposed into the following:

Jerry will write to the Congressman, if Sam will write to the Congressman too.

EXAMPLE 2.4

Consider the Following Sentence

John will pay for the food if Mary will for the wine.

For preprocessing before translation to another language, the words omitted by ellipsis will be added back or copied to make the above sentence complete and a comma will be added to separate the main clause and the subordinate clause. This sentence after preprocessing will be decomposed into the following:

John will pay for the food, if Mary will pay for the wine.

EXAMPLE 2.5

Consider the Following Sentence

John took the money because Mary would not take it.

For preprocessing before translation to another language, the words omitted by ellipsis will be added back or copied (through IT regeneration rule) to make the above sentence complete and a comma will be added to separate the main clause and the subordinate clause. This sentence after preprocessing will be decomposed into the following:

John took the money, because Mary would not take the money.

EXAMPLE 2.6

Consider the Following Sentence

I'll have a soda if you'll have one.

For preprocessing before translation to another language, the words omitted by ellipsis will be added back or copied (through a regeneration rule) to make the above sentence complete and a comma will be added to separate the main clause and the subordinate clause. This sentence after preprocessing will be decomposed into the following:

I'll have a soda, if you'll have a soda.

An adjectival complex sentence consists of a main clause and a dependent adjectival clause. The following are some examples illustrating how adjectival complex sentences are decomposed according to the method of the invention.

EXAMPLE 3.1

Consider the Following Sentence

Gardens untended by owners will be taken over by the neighbors.

For preprocessing before translation to another language, the words omitted by ellipsis will be added back to make the above sentence complete.

Gardens that are untended by owners will be taken over by the neighbors.

A period will be added to separate this complex sentence into two simple sentences. The original sentence after preprocessing will be decomposed into the following:

There are gardens untended by owners. They will be taken over by the neighbors.

EXAMPLE 3.2

Consider the Following Sentence

No one decent will accept such money.

For preprocessing before translation to another language, the words omitted by ellipsis will be added back to make the above sentence complete.

No one who is decent will accept such money.

A period will be added to separate this complex sentence into two simple sentences. Notice here a negation transformation rule is applied. The original sentence after preprocessing will be decomposed into the following:

One is decent. One will not accept such money.

EXAMPLE 3.3

Consider the Following Sentence

The fortunate in this country should share their wealth.

A period will be added to separate this complex sentence into two simple sentences. The original sentence after preprocessing will be decomposed into the following:

There are fortunate people in this country. They should share their wealth.

Complex sentences can also be constructed when two or more sentences are equal importance are connected with coordinating conjunctions. This is called coordination. The common coordinating conjunctions typically comprise the following: "and", "or", "but", "nor", "yet", "for", "so", "therefore" and "then".

When translating complex sentences from English into other languages, it is often unnecessary to translate coordinating conjunctions. In fact, it would be awkward to include coordinating conjunctions in a set of sentences. The following are some examples illustrating how complex sentences with coordinating conjunctions are decomposed according to the method of the invention.

EXAMPLE 4.1

Consider the Following Sentence

She saved so that she could buy candy and so that she could buy clothing.

A period will be added to separate this complex sentence into two simple sentences. The original sentence after preprocessing will be decomposed into the following:

She saved so that she could buy candy. She could buy clothing.

EXAMPLE 4.2

Consider the Following Sentence

They are living in Tuscany or they are spending a vacation there.

A period will be added to separate this complex sentence into two simple sentences. The original sentence after preprocessing will be decomposed into the following:

They are living in Tuscany. Or they are spending a vacation there.

Alternatively, this sentence can be further decomposed into two simple sentences separated by a comma:

They are living in Tuscany, or they are spending a vacation there.

EXAMPLE 4.3

Consider the Following Sentence

I may see you tomorrow or may phone later in the day.

A period will be added to separate this complex sentence into two simple sentences. The original sentence after preprocessing will be decomposed into two sentences showing below:

I may see you tomorrow. Or I may phone later in the day.

EXAMPLE 4.4

Consider the Following Sentence

John never smoked cigarettes or drank alcohol.

A period will be added to separate this complex sentence into two simple sentences. The original sentence after preprocessing will be decomposed into two sentences showing below:

John never smoked cigarettes. John never drank alcohol.

Some complex sentences may include an apposition, which is a grammatical construction in which two usually adjacent nouns having the same referent stand in the same syntactical relation to the rest of a sentence. A complex sentence with an apposition can typically be decomposed to two or more simple sentences.

The following are some examples illustrating how complex sentences with an apposition are decomposed according to the method of the invention.

EXAMPLE 5.1

Consider the Following Sentence

An unusual present was given to him for his birthday, a book on ethics.

The apposition will be completed to a full sentence and the main clause will become another sentence, and a period will be added to separate these two sentences. The original sentence after preprocessing will be decomposed into two sentences showing below:

An unusual present was given to him for his birthday. It was a book on ethics.

EXAMPLE 5.2

Consider the Following Sentence

Pauline Kale, the distinguished film critic, died in her sleep last night.

The apposition will be completed to a full sentence and the main clause will become another sentence, and a period will be added to separate these two sentences. The original sentence after preprocessing will be decomposed two sentences showing below:

Pauline Kale was the distinguished film critic. She died in her sleep last night.

EXAMPLE 5.3

Consider the Following Sentence

That he didn't notice the car till too late is unsatisfactory.

The apposition will be completed to a full sentence and a period is added to separate the new sentence, and the main clause will become another sentence, and a period will be added to separate these two sentences. The original sentence after preprocessing will be decomposed into two sentences showing below:

He didn't notice the car till too late. That is unsatisfactory.

Some complex sentences may contain a non-restrictive modifier. A non-restrictive modifier is a phrase or clause that does not restrict or limit the meaning of the word it is modifying. It is, in a sense, interrupting material that adds extra information to a sentence. Even though removing the non-restrictive element would result in some loss of meaning, the sentence would still make sense without it.

Non-restrictive modifiers are often preceded by one of these markers: "that is to say", "that is", "i.e.", "namely", "viz.", "to wit", "in other words", "or", "or rather", "or better", "and", "as follows", "for example", "for instance", "e.g.", "say", "including", "included", "such", "especially", "particularly", "in particular", "notably", "chiefly", "mainly", and "mostly". Some non-restrictive modifiers may be recognized by the absence of article.

When decomposing complex sentences with non-restrictive modifiers, the non-restrictive modifiers often take weighted segmentation. The following are some examples illustrating how complex sentences with non-restrictive modifiers are decomposed according to the method of the invention.

EXAMPLE 6.1

Consider the Following Sentence

Johnny, lead singer of the group, just underwent an operation.

For preprocessing before translation to another language, the words omitted by ellipsis will be added back to make the above sentence complete.

Johnny, who was the lead singer of the group, just underwent an operation.

The non-restrictive will be completed to a full sentence and the main clause will become another sentence and a period will be added to separate these two sentences. The original sentence after preprocessing will be decomposed into two sentences showing below:

Johnny was the lead singer of the group. He just underwent an operation.

EXAMPLE 6.2

Consider the Following Sentence

The two men, one a Norwegian and the other a Dane, were awarded medals.

For preprocessing before translation to another language, the words omitted by ellipsis will be added back, or copied, or regenerated, to make the above sentence complete.

The two men, one being a Norwegian and the other being a Dane, were awarded medals.

The two men, one of whom being a Norwegian, and the other of whom being a Dane, were awarded medals.

The non-restrictive will be completed to two full sentences and the main clause will become another sentence, and two periods will be added to separate these sentences. The original sentence after preprocessing will be decomposed into three sentences showing below:

Two men were awarded medals. One of them was a Norwegian. The other was a Dane.

As one can see from the above examples, the decomposed sentences are easier to comprehend that their corresponding original complex sentences.

In addition of the above, syntactic devices used for connecting sentences like the following can be also stripped down with the method of the invention:

1. Time and place relaters;
2. Logical connectors;
3. Substitution;
4. Discourse reference;
5. Comparison;
6. Ellipsis;
7. Structural parallelism.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. A machine translation system for translating a complex sentence in a first language into two or more sentences in a second language, wherein said complex sentence comprises one or more adjectival clauses, coordination clauses, or appositions, the system comprising:
   a memory; and
   a processor implementing:
   a grammar analysis module for identifying main clause, embedded clauses, phrases and all possible cohesive ties linking said embedded clauses to said main clause, said grammar analysis module being associated with a database of complex sentences in said first language;
   a cohesive tie stripping module for identifying and stripping down said possible cohesive ties;
   a punctuation module for applying a weighted punctuation for segmentation to said complex sentence to decompose said complex sentence into simple sentences; and
   a translation module for translating said decomposed simple sentences and phrases into said second language;
   wherein said cohesive ties are stripped down before applying said weighted punctuation for segmentation;
   wherein if one or more words were omitted in said complex sentence by ellipsis, said grammar analysis module is invoked to add said omitted words back to said complex sentence to make said complex sentence grammatically complete before said decomposition of said complex sentence into said simple sentences;
   wherein said punctuation module is invoked to change one or more comma to a period;
   wherein said punctuation module is invoked to supply one or more comma or periods;
   wherein said punctuation module applies a more weighted punctuation to a nonrestrictive clause than to a restrictive clause;
   wherein said translation module is invoked after said decomposition of said complex sentence into said simple sentences; and
   wherein said possible cohesive ties comprises any of: time and place relaters, logical connectors, substitution, disclosure reference, comparison, ellipsis and structure parallelism.

2. The system of claim 1, wherein said first language is English and said second language is Chinese.

3. A method for machine translation of a complex sentence in a first language into two or more sentences in a second language, comprising the steps of:
   performing, using a processor, grammar analysis on a complex sentence to identify main clause, embedded clauses, phrases and all possible cohesive ties linking said embedded clauses to said main clause;
   identifying and stripping down said possible cohesive ties from said complex sentence;
   decomposing said complex sentence into simple sentences and phrases by applying a weighted punctuation to said complex sentence; and
   translating said simple sentences and phrases into a second language;
   wherein said cohesive ties are stripped down before applying said weighted punctuation to said complex sentence;
   wherein if one or more words were omitted in said complex sentence by ellipsis, said grammar analysis is performed to add said omitted words back to said complex sentence to make said complex sentence grammatically complete before said decomposing said complex sentence into said simple sentences;
   wherein said decomposing of said complex sentence changes one or more comma to a period;
   wherein said decomposing of said complex sentence supplies one or more comma or periods;
   wherein a more weighted punctuation is applied to a non-restrictive clause than to a restrictive clause;
   wherein said translating to said second language is performed after said decomposing of said complex sentence into said simple sentences, and
   wherein said possible cohesive ties comprise any of: time and place relaters, logical connectors, substitution, disclosure reference, comparison, ellipsis and structure parallelism, in the forms of noun phrases, verb phrases, adverbial phrases, prepositional phrases, and adjunct-head.

4. The method of claim 3, wherein said first language is English and said second language is Chinese.

* * * * *